United States Patent
Kim et al.

(10) Patent No.: US 8,793,702 B2
(45) Date of Patent: Jul. 29, 2014

(54) TAKE AND SHARE INDICATOR

(75) Inventors: Grace Kim, San Mateo, CA (US);
Wilson Chan, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1410 days.

(21) Appl. No.: 11/977,253

(22) Filed: Oct. 23, 2007

(65) Prior Publication Data

US 2014/0082633 A1   Mar. 20, 2014

(51) Int. Cl.
*G06F 3/00*  (2006.01)
*G06F 9/44*  (2006.01)
*G06F 9/46*  (2006.01)
*G06F 13/00* (2006.01)

(52) U.S. Cl.
USPC ............................................ 719/313

(58) Field of Classification Search
USPC ............................................ 719/313
See application file for complete search history.

(56) References Cited

U.S. PATENT DOCUMENTS

| | | | |
|---|---|---|---|
| 6,970,908 B1* | 11/2005 | Larky et al. | 709/206 |
| 2002/0147661 A1* | 10/2002 | Hatakama et al. | 705/26 |
| 2005/0001904 A1* | 1/2005 | Kiiskinen | 348/207.1 |
| 2005/0105396 A1* | 5/2005 | Schybergson | 368/12 |
| 2007/0030363 A1* | 2/2007 | Cheatle et al. | 348/239 |

* cited by examiner

*Primary Examiner* — Andy Ho
*Assistant Examiner* — Timothy A Mudrick
(74) *Attorney, Agent, or Firm* — Kilpatrick Townsend & Stockton LLC

(57) ABSTRACT

A request to share visual data from a requester is received. The request is stored on a device configured to share visual data. It is determined whether a communication event indicating that the device is about to communicate with the requester has occurred. The communication event includes an indication that contact information associated with the requester is displayed on the device. In the event that it is determined that a communication event has occurred, a reminder to share visual data associated with the request is indicated.

26 Claims, 7 Drawing Sheets

| | | | ⌐400 |
|---|---|---|---|
| Request List | | | |
| Requester | Request | Captured? | Shared? |
| Bob | Night Photo of Eiffel Tower | Yes | No |
| Mom | ○ ○ | No | No |
| Mom | Tagged: Jim | Yes | Yes |

FIG. 4

Contact List 500

| Contact | Email Address | Number of Requests |
|---------|---------------|--------------------|
| Bob | bob@bobexample.com | 1 |
| Mom | lisa@lisaexample.com | 0 |
| Mom | mom@momexample.com | 2 |

FIG. 5A

Contact List 502

| | |
|---|---|
| 1 | Bob |
| 0 | Lisa |
| 2 | Mom |

FIG. 5B

TAKE AND SHARE INDICATOR

BACKGROUND OF THE INVENTION

Digital cameras are increasingly equipped with communication capabilities that may be used to share images. For example, many mobile telephones have the ability to capture images (e.g., take pictures and/or video) and send them over the mobile telephone network (e.g., 2 G, 3 G, etc.). Likewise, an increasing number of digital cameras include networking or other communication capabilities. A user may receive requests for certain images from others, such as friends, family, professional or other contacts. For example, the request may be made through face-to-face conversations, voice mail, email, text messages, etc. As an example, a friend may ask the user to send him a copy of a picture from a birthday party. The user is expected to rely on his memory or document a reminder manually, such as on a sticky note, calendar reminder, flagged email, etc. Relying on a person's memory or documentation is far removed from the act of capturing and sharing an image and places burden of remembering on the user, who is expected to remember and manage these requests. As a result, many requests end up being unfulfilled. Improvements in image sharing would be desirable.

BRIEF DESCRIPTION OF THE DRAWINGS

Various embodiments of the invention are disclosed in the following detailed description and the accompanying drawings.

FIG. 4 is a diagram illustrating an embodiment of a request list interface.

FIG. 5A is a diagram illustrating an embodiment of a contact list interface.

FIG. 5B is a diagram illustrating another embodiment of a contact list interface.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
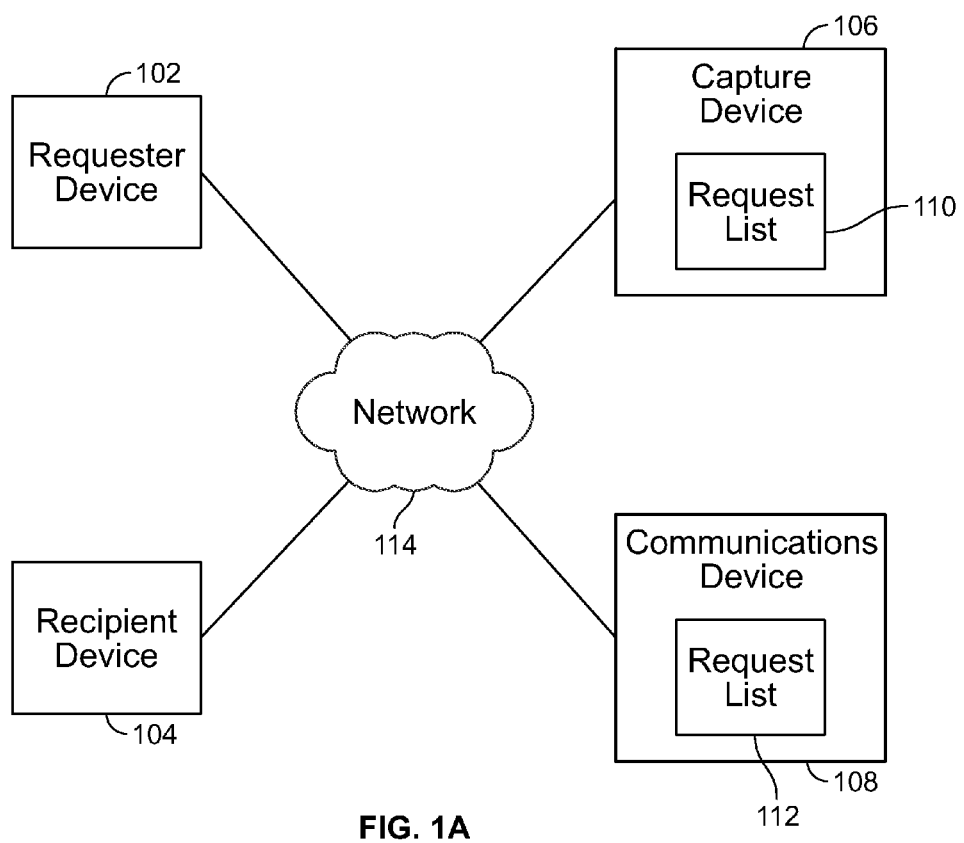
FIG. 1A is a block diagram illustrating an embodiment of a system for capturing and sharing visual data.

FIG. 1A is a block diagram illustrating an embodiment of a system for capturing and sharing visual data. As used herein, visual data may include an image, a video, a slide, an animation frame, or any other type of data in which information is conveyed visually. A plurality of devices 102, 104, 106, and 108 is connected via network 114. Network 114 may comprise a heterogenous group of networks; that is, devices 102-108 may communicate using a variety of network types, such as the Internet, WiFi, Bluetooth, a mobile telephone network, such as GPRS, a cable, etc. For example, requester device 102 may communicate with communications device 108 via the Internet. Communications device 108 may communicate with capture device 106 via Bluetooth or via a direct cable connection, e.g., via a USB port connecting the two devices. One or more of devices 102-108 may include, for example, a digital camera, a digital video camera or recorder, a mobile telephone, a personal digital assistant (PDA), a desktop computer, or a mobile computer.

Capture device 106 is used to capture visual data, such as an image. For purposes of explanation, the examples herein will describe an image. However, any type of visual data may also be used in the various embodiments described herein. Examples of capture device 106 include: digital capture devices, digital still cameras, digital video cameras or recorders, digital single lens reflex cameras, etc. Communications device 108 is used to share an image, such as via email or instant messaging. Examples of communications device 108 include a desktop computer or a mobile computer. In some embodiments, capture device 106 and communications device 108 are the same device, such as mobile telephones with a built-in camera, PDAs with a built-in camera, etc.

Requester device 102 is used to communicate a request to capture device 106 and/or communications device 108. Examples of requester device 102 include a mobile telephone, a desktop computer, etc. For example, a requester may use a desktop computer to email a request for a particular image to communications device 108. The request may specify recipient information, such as an email address, a website, or a mobile telephone number, to which to send the requested image. For example, the request may be sent in an email with a prespecified subject or a tag that indicates that the email includes a request. There could be a particular telephone number to call to leave a voice mail, a particular email address to which to send the request in an email message, or some other option associated with a communication used to indicate that the communication is a request. The user's telephone number could be called and the appropriate buttons pressed to reach a voice mail box for leaving requests. Recipient device 104 is the device used by the requester to receive the image, such as a personal computer or a mobile telephone. Requester device 102 and recipient device 104 may be the same device.

Capture device 106 and communications device 108 each include a request list. The request list includes all requests for images. In cases in which capture device 106 and communications device 108 are separate devices (i.e., are not the same device), request list 110 and request list 112 may be synchronized at various times, depending on the embodiment. For example, they may be synchronized upon connecting, and then periodically as long as they remain connected to each other. Some embodiments of request lists are more fully described below.

Figure 1B:
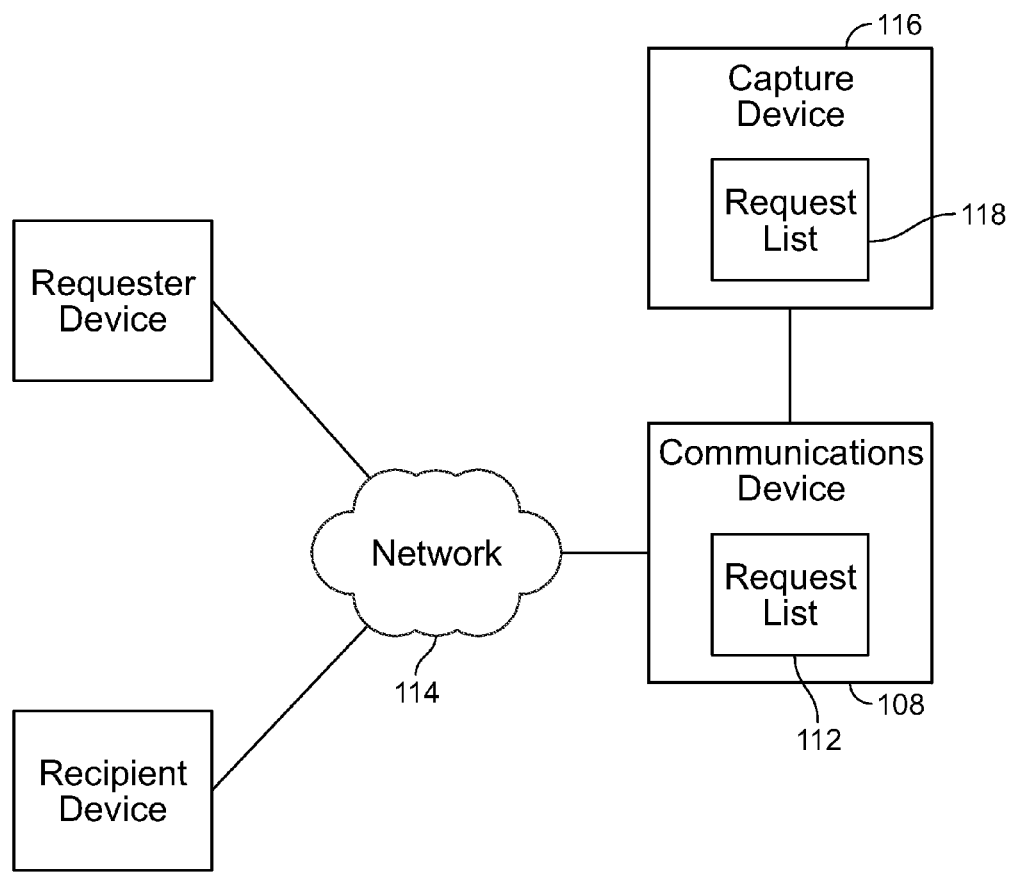
FIG. 1B is a block diagram illustrating an embodiment of a system for capturing and sharing visual data including a capture device that is not networked.

Devices 102-108 are not necessarily each able to communicate with every other device 102-108. For example, capture device 106 may only be able to communicate with communications device 108 in some embodiments. FIG. 1B is a block diagram illustrating an embodiment of a system for capturing and sharing visual data including a capture device that is not networked. For example, capture device 116 may be a digital camera without networking capabilities and communications device 108 may be a desktop or laptop personal computer. In this case, a user can connect the digital camera to the personal computer, e.g., via USB, to download images to the personal computer and/or to synchronize request list 118 with request list 112. The user in such an embodiment then shares one or more of the images using the personal computer via network 114, e.g., via email.

Figure 2:
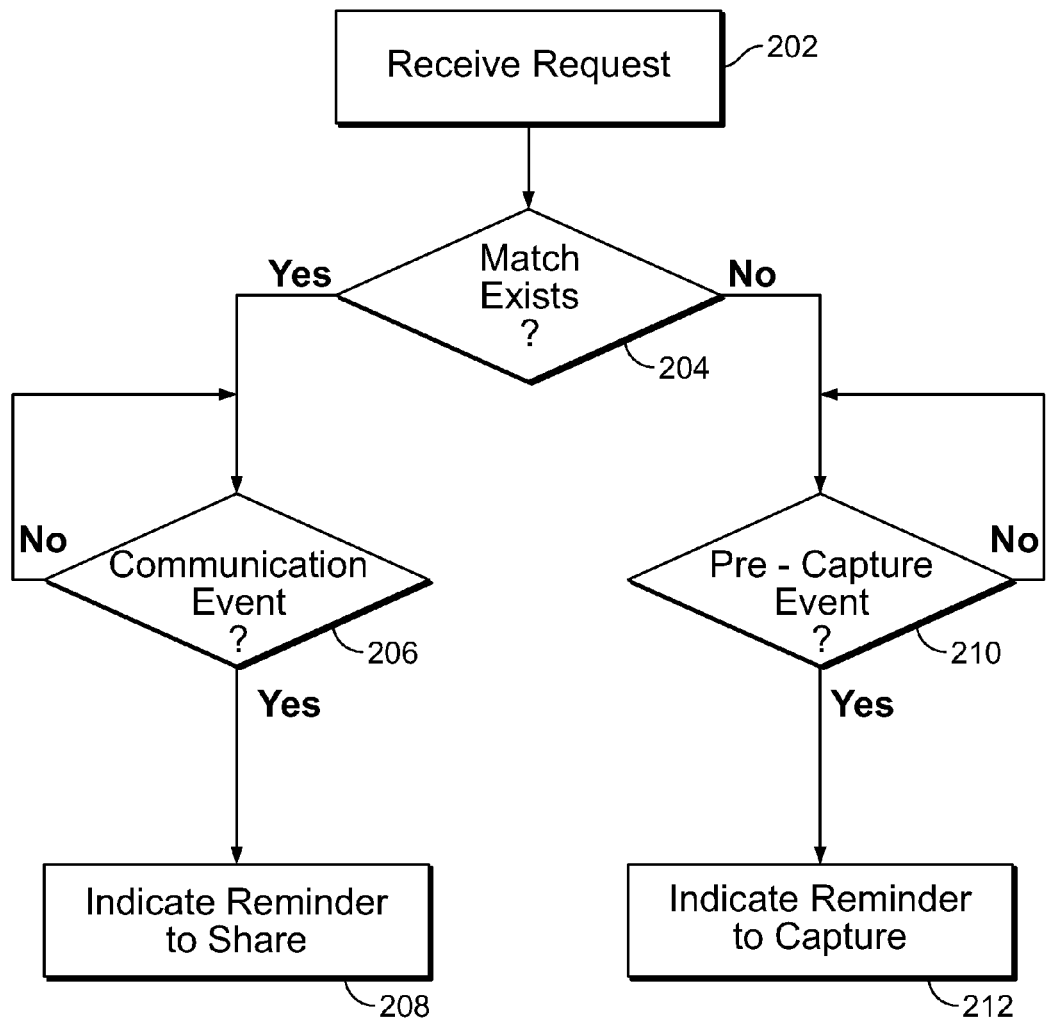
FIG. 2 is a flow chart illustrating an embodiment of a process for indicating a reminder associated with capturing and/or sharing an image.

FIG. 2 is a flow chart illustrating an embodiment of a process for indicating a reminder associated with capturing and/or sharing an image. For example, this process may be performed by capture device 106 (or 116) and/or communications device 108. At 202, a request is received. The request is a request for one or more desired images. The request may be sent by a friend, a family member, or a professional or other contact. The request may be sent using email, voice mail, a text message (e.g., SMS), an instant message, a website (such as a website for the capture device), etc.

The request may specify the desired images in a variety of ways. For example, there may be a unique identifier for the image that is known by the requester and that identifier is included in the request. The requester may not have a particular image in mind, and just requests all images with a particular tag. In some cases, the requested image may not have been captured yet.

The request may be described using text, voice, video, or in any other appropriate way. The requester may use natural language to specify the request, e.g., a voicemail, text message, or email message saying "a picture of mom with Rover". The request may specify a time and/or place (location), e.g., "mom at Eiffel Tower", "mom on her birthday", or "mom at the Eiffel Tower at night". A specific time (e.g., 5 pm) or time span (e.g., 5-8 pm) or a general time (dusk or evening) or time span (afternoon to evening) may be specified in various embodiments.

In some embodiments, when a request is received, the user is alerted, e.g., via a text message, an instant message, and/or an email message. In some embodiments, the user can decide whether to accept or ignore the request. For example, if the request is accepted, the process proceeds to 204. If the request is ignored, the request might be deleted or stored as an ignored request, for example. Later, the user may decide to activate the request, in which case the process proceeds to 204.

At 204, it is determined if a match exists. In other words, based on the request, it is determined whether there is an existing image that matches the request. For example, the images and metadata associated with the images may be analyzed to determine if any image matches the request. A variety of techniques may be used to analyze the images and metadata.

In some embodiments, the capture device includes a GPS receiver and is able to track the location of the device. In some embodiments, the location can be matched with known location coordinates of places, such as the Eiffel Tower. In some embodiments, the capture device and/or communications device can use object detection (e.g., face detection) and/or object recognition (e.g., face recognition) to determine a subject or content of an image. In addition, color or color schemes and other information about the image can be determined. The image can be analyzed for other information, such as time of day (e.g., by analyzing lighting), whether the image was taken indoors or outdoors, etc.

In some embodiments, a certainty value is generated in making a decision at 204. For example, there may be an exact match with 100% certainty (e.g., an image with a given tag or an image with a given identifier). In some cases, a certainty may be provided based on how close the match is. For example, if the request is for "a picture of Mom and Rover", facial recognition may be used to find an image that with some certainty includes Mom and Rover in it. There may be a threshold used to determine if there is a match. For example, if the certainty is above 75%, it is considered a match; otherwise, it is not a match.

In some embodiments, even if it is determined that a match exists at 204, a user may decide to override that decision. In that case, the process would proceed to 210.

If it is determined that a match does exist, then at 206, it is determined whether there is a communication event. A communication event refers to a moment of communication, or some time period before a user is about to communicate or share information with another person via email or another means of communication. In some embodiments, a communication event is the opening of an email program (e.g., Gmail, Yahoo Mail, Microsoft Outlook, etc.) or a contact list within the email program. In some embodiments, the communication event is specific to the request. For example, if the user is composing an email message to the requester, the communication event is triggered the moment the user adds the requester to the "To" line, or when the user is scrolling down the contact list and the requester's name is displayed in the list.

In some embodiments, any point or event at which contact information (e.g., name, email address, telephone number, username, etc.) of the requester appears, is present, and/or is displayed is considered a communication event. An example of such a communication event is when the user's telephone is ringing and a caller ID display displays contact information, or if not displayed, a telephone (or receiver) is able to identify caller ID contact information.

In some cases, displaying an image that matches the request is considered a communication event (since the user may then see the reminder and decide to share the image at that point). A communication event could also occur when synchronizing reminder lists and/or images. For example, in FIG. 1B, a communication event may occur as a result of connecting capture device 116 to communications device 108 (via a wired or wireless connection), downloading one or more images, and/or synchronizing request lists 112 and 118.

If it is determined that there is no communication event, the process returns to 206 and checks again whether there is a communication event. In some embodiments, this occurs periodically. In some embodiments, it occurs in response to some event, such as opening an email program and/or selecting a "compose" or "new message" button (e.g., all potential communication events may trigger the determination, but only communication events specific to the request may trigger a share reminder). In some embodiments, a request is stored in a list (e.g., request list 110 and/or 112) until some appropriate event and/or time and this list is checked and/or accessed during second or later occurrences of a communication event. In some embodiments, a request is removed from such a list when a user indicates that a given request be removed. In some embodiments, a request is removed from a list after some period of time, automatically after at least one image is shared, etc.

If it is determined that there is a communication event, then at 208, a reminder to share is indicated. In other words, because there is a potential opportunity to share an image that matches a request, a reminder is indicated. The reminder may be visual (e.g., an icon is displayed, the requester's name is shown in bold or green, etc.) and/or may be auditory (e.g., a chime or other sound is played). The reminder may be in the form of a dialog or popup box that opens. For example, the dialog box might say "Share Reminder: You are about to send an email to Mom. Mom has requested an image of the Eiffel Tower. You have 2 images of the Eiffel Tower. Do you want to share them with Mom now?". There might be a "No" button and a "Yes" button. Pressing the "Yes" button might open a preview window that previews the images that were found to match the request. The user can then share both, one, or none of the images at this time. The user may also remove or clear the request, e.g., if the user does not wish to share images that match the request.

Sharing can be performed in a variety of ways in various embodiments. Sharing can be performed by attaching the image to be shared as an email attachment, posting the image to a website for sharing (where the URL could be private to the requester), sending the image to the requester's cell phone, etc. In some embodiments, the requester could specify how the recipient would like to receive the image, e.g., an email address, a website and associated username, etc. In some cases, the requester may specify preferences (e.g., email), and the user can decide the means to share.

Returning to 204, if it is determined that a match does not exist, then at 210, it is determined whether there is a pre-capture event. A pre-capture event refers to a moment of capture, or some time period before a user is about to capture an image. For example, a pre-capture event may be the powering on of a digital camera and/or putting a device into capture mode. In some embodiments, the pre-capture event is specific to the request. For example, if the camera is in capture mode near the Eiffel Tower, the communication event could be triggered if the request is to take a picture of the Eiffel Tower. The camera could determine that it is near (e.g., within a prespecified distance from) the Eiffel Tower using a GPS receiver or using object detection (and detecting a tower shape in the viewfinder), for example. In another example, if the request is to take a picture at a certain time on a certain date, and the camera is in powered on at that time, a pre-capture event could be triggered.

If it is determined that there is no pre-capture event, the process returns to 210 and checks again whether there is a pre-capture event. In some embodiments, a request is stored in a request list (e.g., request list 110 and/or 112). In some embodiments, requests' association with a communication event and/or a pre-capture event are saved in some manner to distinguish between the two. Some embodiments include storing the requests in different files or using some register or bit to indicate whether it is associated with a communication event or a pre-capture event. In various embodiments, subsequent occurrence of step 210 occurs periodically, in response to some event, such as powering on the camera and/or switching to capture mode (e.g., all potential pre-capture events may trigger the determination, but only pre-capture events specific to the request may trigger a reminder to capture), etc.

If it is determined that there is a pre-capture event, then at 212, a reminder to capture is indicated. In other words, because there is a potential opportunity to capture an image that matches a request, a reminder is indicated. The reminder may be visual (e.g., an icon is displayed, the requester's name and/or a description of the request is shown, etc.) and/or may be auditory (e.g., a chime or other sound is played). For example, a message might be displayed that says, "Capture Reminder: Mom has requested an image of the Eiffel Tower. You are at or near the Eiffel Tower."

In some embodiments, after 212, the process returns to 204, and it is determined if the recently captured image matches the request (or a different request), and the process continues as described above. For example, if the recently captured image matches, then it is determined if there is a communication event at 206. In some embodiments, a corresponding request is updated to reflect the change in state. For example, a corresponding request is moved from one list or file to another, or a bit or register is updated.

In some embodiments, at 210, instead of or in addition to determining if there is a pre-capture event, it is determined if there is a communication event, and in response to a positive determination, a reminder to capture is indicated at 212. For example, a reminder to capture might be indicated when the requester's name is displayed in a contact list.

In some embodiments, 204 is optional. If there is a communication and/or pre-capture event, a reminder to share and/or a reminder to capture is indicated. The exact triggers for which reminders to indicate may be configurable.

In some embodiments, a communication event (206) and/or a pre-capture event (210) are contextual to an action the user is performing, as opposed to an external event, such as time or location. Examples of actions the user is performing include pressing buttons and/or changing modes on a capture and/or communication device.

In some cases, the sender may specify with the request, e.g., using a tag or other indicator, that the reminder be triggered by certain communication event(s) and/or certain pre-capture event(s), in which case, at 206 and or 210, a communication event and/or pre-capture event is triggered based on the request.

In some embodiments, a requester can view other requests that were sent to the user and/or the user's capture device and/or communication device. For example, the requester can go to a website associated with the user and/or the user's capture device and/or communication device, and other requests (e.g., that are designated as public or allow access to that requester) may be viewable. For example, the user may see that Bob is requesting a particular image and make that request as well. The requester can be an individual or a group. For example, Mr. and Mrs. Jones (two recipients) may send a request to a real estate agent (e.g., for all images tagged "Jones"), or a boy scout troup (many recipients) may send a request to a troop leader. When the troop leader shares an image(s) matching the request, it gets shared with all the troop members that are part of the recipient group. In some embodiments, a user who distributes visual data is able to control or limit access to such information. For example, the user may permit only certain requests to be accessed or visible to any requester or certain requesters. In some embodiments, access for a given request is permitted to other requestors on a requester by requestor basis.

In some embodiments, the requester may specify an urgency status and/or due date. In some cases, after a certain time period or due date, the request is cleared or removed automatically. The user may first be prompted before the request is removed. In some cases, as time gets closer to the due date, the request becomes more urgent. In some cases, more urgent or urgent requests are treated differently. For example, reminders associated with these requests might visually and/or audibly stand out more (e.g., take over the whole screen, flash, be displayed in a large bold red font, cause a loud and/or distinctive audio file to be played, etc.).

Figure 3:
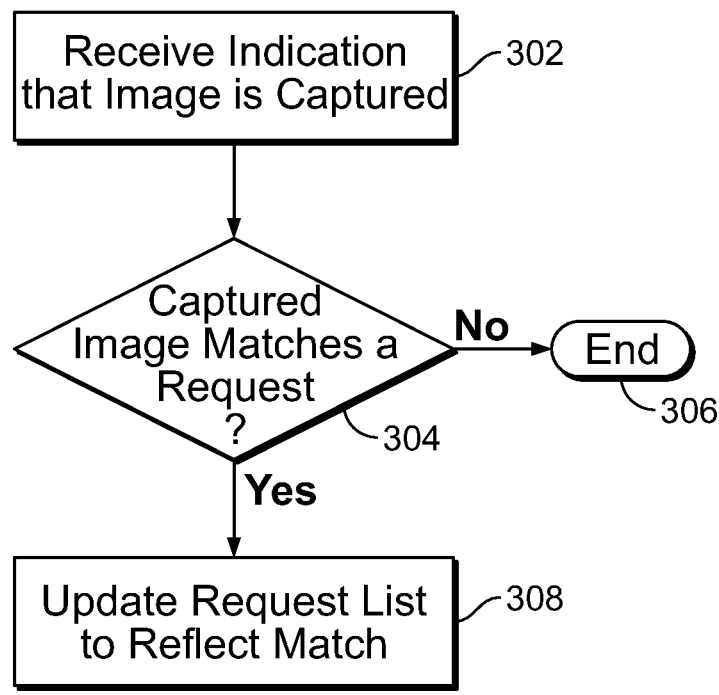
FIG. 3 is a flowchart illustrating an embodiment of a process for responding to an indication that an image is captured.

FIG. 3 is a flowchart illustrating an embodiment of a process for responding to an indication that an image is captured. For example, this process may be performed whenever a new image is captured. At 302, an indication that an image is captured is received. For example, a user has just taken a picture. At 304, it is determined whether the captured image matches a request. Matching may be performed in a variety of ways in various embodiments. Some examples of matching techniques are described above with respect to 204. If it is determined that the captured image does not match a request, the process ends at 306. In some embodiments, a corresponding request is not necessarily canceled at this point; the next time an indication is received the example process is repeated. If it is determined that the captured image matches a request, a request list is updated to reflect the match at 208. For example, the request list may be updated to indicate that an image matching a request has been captured. In addition, other appropriate data is updated to indicate the match. For example, a contact list list may be updated to indicate that a request associated with a particular contact has a matching image ready to be shared.

FIG. 4 is a diagram illustrating an embodiment of a request list interface. In this example, request list interface 400 displays data from a request list, such as request list 110, 112, or 118. Request list interface 400 may be displayed by a capture device and/or a communications device. In this example, request list interface 400 includes four columns: "Requester", "Request", "Captured?", and "Shared?". "Requester" indicates the requester, which indicates who made the request. "Request" provides a description of the request. "Captured?" indicates whether an image has been captured that matches the request. "Shared?" indicates whether an image that matches the request has been shared. In some embodiments, there is no "Shared?" column, since a request that has been captured and shared is considered fulfilled and fulfilled requests are automatically removed or cleared from the request list. In some embodiments, before a request is removed from the request list, the user is prompted, e.g., for confirmation. For example, a message that says, "This request has been fulfilled. Delete it from the request list?" may be displayed. In some embodiments, whether a request is automatically removed from the request list (upon fulfillment of the request) is user configurable.

In some embodiments, once a requester receives a shared image, the requester may send a message to clear the request. In some embodiments, the requester may clear the request, e.g., if the requester changed his mind. The requester may send an indication to clear the request in a variety of ways, such as any of the ways used to send the request, as previously described. A user may also manually remove a request from the request list. For example, the user may not desire to share a particular image being requested. In some embodiments, a user is able to offer sharing only to a subset of the user's contacts.

In some embodiments, a confirmation or return receipt is required in order for the "Shared?" column to be updated to "Yes" for a request. In other words, the recipient confirms that the requested image was received by the recipient, and the capture device and/or communication device receives the confirmation before the shared column is updated and/or the user is prompted to remove the request.

In some cases, such as the case of FIG. 1B, a request cleared in one of request lists 110 and 112 is cleared in the other request list on the next synchronization between devices 106 and 108.

As shown, there are three requests currently: one from Bob and two from Mom. Bob's request is for a "Night Photo of Eiffel Tower". For example, Bob may have sent this request via email to an email address associated with a capture device, communications device, and/or the user (of the capture device and/or communications device). Bob could also have text messaged the request or sent the request in a variety of other ways. Bob used natural language to describe his request. In some cases, natural language requests are processed or parsed to determine matches. For example, the term "night" might be parsed out and associated with the time period 6 pm-4 am. Any images with metadata indicating they were taken in that time period and/or dark images may be considered a match. Turning on a capture device and putting it in capture mode during that time period and/or having a dark viewfinder screen may trigger an indication of a reminder to capture (210-212). In some cases, a likelihood or probability of a match might be presented. The user can manually review images to determine whether they actually do match the request before sharing the image. In some cases, the user can modify the "Captured?" column after determining that the image isn't a match.

Mom's first request is an audio request, as indicated by the audiotape icon. To listen to the request, the user can select or click on the audiotape icon (e.g., by touching it, if being displayed in a touch sensitive display). Mom could have sent this request, for example, by calling a telephone number and selecting the appropriate menu options (or calling a telephone number associated with a capture device, communications device, and/or the user (of the capture device and/or communications device)) and leaving a voice message. Mom could also have sent an audio file via email. Mom's second request is for all images tagged Jim. Similarly, Mom may have sent this request in a variety of ways, such as via email or text messaging. Mom may have used a web interface associated with making requests to make this request. For example, the web interface might include an option for indicating a tag and a place for entering tag words or selecting a tag word from a pull down menu (which may have a list of the tags the user is using).

In some embodiments, in Mom's second request, Mom could have specified whether to send all existing images tagged "Jim", all future images tagged "Jim", or both. In the case in which future images is included, then this request would not get automatically deleted just because the request was fulfilled with respect to all existing images tagged "Jim" in some embodiments.

Although one or more images may have been found to match Mom's second request, the user may filter through the matches and decide which matching images to actually share. In some embodiments, matches which the user does not desire to share with a particular requester can be undesignated as a match; that is, such images would not be indicated as captured or part of a count of a total number of matches for a request.

In various embodiments, the request list interface may include a variety of information. For example, the number of matches for each request could be indicated, how recent or old the request is could be indicated, and/or colors, fonts, or icons could be used to indicate whether a match exists. For example, the request description may be shown in different colors, where red may indicate that a match does not exist, yellow may indicate that a match might exist or there is a potential match (e.g., the match might have a probability of 60%, and the user may want to manually confirm the match), and green may indicate that a match exists.

The request list may be updated manually (e.g., a user updates the "Captured?" column to indicate that a matching image has been captured (e.g., if matching was not automatically detected) or to indicate that a matching image has not been captured (e.g., if a false match was automatically detected) and/or automatically (e.g., 308). In another example, the user may update the "Request" column to add personal notes, etc.

FIG. 5A is a diagram illustrating an embodiment of a contact list interface. In this example, contact list interface 500 displays data from a contact list associated with a user. In some embodiments, contact list interface 500 is associated with an email application or a mobile telephone. Contact list interface 500 may be displayed by a capture device and/or a communications device. In this example, contact list interface 500 includes three columns: "Contact", "Email Address", and "Number of Requests". In various embodiments, contact list interface 500 may include other information, such as telephone number, mailing address, username, etc. Examples of contact lists include email or other address books, buddy lists, etc. In the example shown, contact list interface 500 may be opened in order to obtain an email address, for example, when a user is composing an email message. From contact list interface 500, it can be seen that contacts Bob and Mom have made 1 and 2 requests, respectively. In some embodiments, contact list interface 500 indicates information about whether and how many requests have matching images and/or have been fulfilled. For example, visual indicators in the form of graphics, color, a flashing icon or other graphic, etc., may be used, as more fully described below.

FIG. 5B is a diagram illustrating another embodiment of a contact list interface. In this example, contact list interface 502 displays data from a contact list associated with a user. Contact list interface 502 may be displayed by a capture device and/or a communications device. In some cases, contact list interface 502 is displayed on a device with a smaller screen, such as on a digital camera or mobile telephone. To the left of each contact, a box with a number in it is shown. In this example, the number indicates the number of requests made by that contact. In some embodiments, if any of those requests match an existing (captured) image, then the number and/or box is shown in green.

Interfaces 500 and 502 show examples of an indication of a reminder to share visual data at 208. In various embodiments, other types of reminders to share may be used. For example, an audio indicator (e.g., a tone or chime played) and/or other types of visual indicators (e.g., using graphics or color) may be used in a contact list interface or other interface associated with a communication event (e.g., a compose new message window). Other examples of indications of a reminder to share include pop up or dialog windows opening with messages describing the request, etc.

Figure 6:
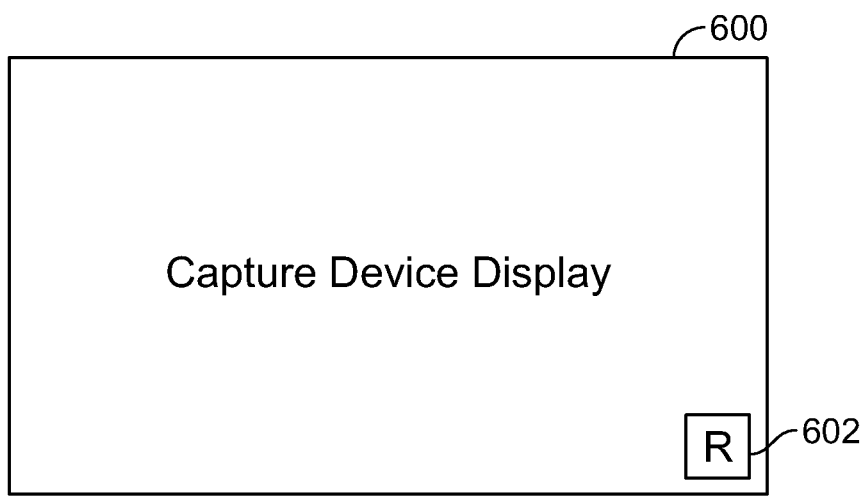
FIG. 6 is a diagram illustrating an embodiment of a capture device display.

FIG. 6 is a diagram illustrating an embodiment of a capture device display. For example, capture device display 600 is a screen on a digital camera or other capture device, where the screen is used as a viewfinder when the device is in capture mode and/or as a viewing screen when in playback mode (when viewing existing images). This diagram shows an example of an indication of a reminder to capture at 212. In this example, capture device display 600, when in capture mode, functions as a viewfinder. In other words, the image about to be captured is shown in capture device display 600.

In some embodiments, when there is a pre-capture event, a visual indicator of a reminder to capture is shown in the capture device display. For example, icon 602 is shown at the bottom right of the display (where "R" stands for "Reminder").

In some embodiments, when a capture device is in playback mode (i.e., such that already captured and/or existing images are displayed in capture device display 600), when an image matching a request is displayed in capture device display 600, icon 602 is displayed as an indication of a reminder to share. In other words, displaying images is considered a communication event in this case. For example, viewing an image that matches a request may be a convenient or desirable time to remind a user about a request from another person for images.

In some embodiments, selecting icon 602 (e.g., by touching it, if display 600 is touch sensitive), causes a description of the request to be displayed or played audibly. In other embodiments, icon 602 is a thumbnail of the requester's face or an avatar associated with the requester. In some embodiments, icon 602 may be an audiotape icon, similar to that shown in FIG. 4, in which case selecting the icon plays an audio recording of the request. In some embodiments, icon 602 also includes a number indicating the number of requests that match the image about to be captured and/or the image being viewed.

In various embodiments, various types of reminders to capture and/or share may be used. For example, an audio indicator (e.g., a tone or chime played) and/or other types of visual indicators (e.g., using still or flashing graphics, color) may be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, including:
receiving a request to share visual data from a requester;
storing the request on a device configured to share visual data;
determining whether a match to the request exists, wherein determining the match comprises comparing information associated with the request to characteristics of existing visual data that has previously been captured;
in response to determining that the match to the request for existing visual data exists:
determining whether a communication event indicating that the device is about to communicate with the requester has occurred, the communication event including an indication that contact information associated with the requester is displayed on the device; and
in response to determining that the communication event has occurred, indicating a reminder to share visual data associated with the request.

2. The method of claim 1, further comprising:
in response to determining that the communication event has occurred, indicating a reminder to capture visual data associated with the request.

3. The method of claim 1, wherein determining whether the communication event has occurred is based at least in part on the information associated with the request.

4. The method of claim 1, wherein the request is received via electronic mail, voice mail, instant messaging, or text messaging.

5. The method of claim 1, wherein:
the information associated with the request indicates desired content of the visual data; and
determining the match comprises determining whether the desired content is included in the existing visual data that has previously been captured.

6. The method of claim 1, wherein:
the information associated with the request includes a tag or metadata associated with the visual data; and
determining the match comprises determining whether the tag or metadata is included in the existing visual data that has previously been captured.

7. The method of claim 1, wherein:
the information associated with the request indicates one or more of a time, a time span, and a date; and
determining the match comprises determining whether the existing visual data that has previously been captured was captured during the indicated time, time span, or date.

8. The method of claim 1, wherein:
the information associated with the request indicates a location; and
determining the match comprises determining whether the existing visual data that has previously been captured was captured at the indicated location.

9. The method of claim 1, wherein the visual data includes an image or a video.

10. The method of claim 1, wherein the device includes a camera, a video recorder, a mobile telephone, a personal digital assistant (PDA), a desktop computer, or a mobile computer.

11. The method of claim 1, further including synchronizing a request list stored on the device with a request list stored on another device.

12. The method of claim 1, wherein the reminder includes a visual or audio indicator.

13. The method of claim 1, further including determining whether the visual data has been captured.

14. The method of claim 13, wherein the reminder to capture the visual data is indicated in response to determining that the visual data has not been captured.

15. The method of claim 1, further including displaying a list of requests including requests from one or more requesters.

16. The method of claim 1, further including determining whether captured visual data matches a request.

17. The method of claim 1, further including receiving an indication that the request has been fulfilled.

18. The method of claim 17, further including removing the request from a request list in response to the indication.

19. A system, including:
a processor; and
a memory coupled with the processor and having instructions stored thereon, which, when executed by the processor, cause the processor to perform operations comprising:
receiving a request to share visual data from a requester;
storing the request on a device configured to share visual data;
determining whether a match to the request exists, wherein determining the match comprises comparing information associated with the request to characteristics of existing visual data that has previously been captured;
in response to determining that the match to the request for existing visual data exists:
determining whether a communication event indicating that the device is about to communicate with the requester has occurred, wherein the communication event includes an indication that contact information associated with the requester is displayed on the device; and
in response to determining that a communication event has occurred, indicating a reminder to share visual data associated with the request.

20. A non-transitory computer readable storage medium having instructions stored thereon, that when executed by a computing device, cause the computing device to perform operations comprising:
receiving a request to share visual data from a requester;
storing the request on a device configured to share visual data;
determining whether a match to the request exists, wherein determining the match comprises comparing information associated with the request to characteristics of existing visual data that has previously been captured;
in response to determining that the match to the request for existing visual data exists:
determining whether a communication event indicating that the device is about to communicate with the requester has occurred, the communication event including an indication that contact information associated with the requester is displayed on the device; and
in response to determining that the communication event has occurred, indicating a reminder to share visual data associated with the request.

21. A method, including:
receiving a request to share visual data from a requester;
storing the request on a device configured to capture visual data;
determining whether a pre-capture event has occurred, wherein the pre-capture event:
includes an indication that the device is about to capture visual data that matches the request, the match being based on comparing information associated with the request to the visual data the device is about to capture;
is contextual to an action a user of the device is performing; and
comprises an action performed on the device by the user; and
response to determining that the pre-capture event has occurred, indicating a reminder to capture visual data corresponding to the request.

22. The method of claim 21, wherein determining whether the pre-capture event has occurred is based at least in part on location information associated with the request.

23. The method of claim 21, further including synchronizing a request list stored on the device with a request list stored on another device.

24. The method of claim 21, further including determining whether the visual data has been captured.

25. A non-transitory computer readable storage medium having instructions stored thereon, that when executed by a computing device, cause the computing device to perform operations comprising:
receiving a request to share visual data;
storing the request on a device configured to capture visual data;
determining whether a pre-capture event has occurred, wherein the pre-capture event:
includes an indication that the device is about to capture visual data that matches the request, the match being based on comparing information associated with the request to the visual data the device is about to capture; and comprises an action performed by a user of the device; and in response to determining that the pre-capture event has occurred, indicating a reminder to capture visual data associated with the request.

26. The method of claim 21, wherein the request is specifically addressed to or otherwise directed at the device configured to capture the visual data.

* * * * *